US009240004B2

(12) United States Patent
Weitzman

(10) Patent No.: US 9,240,004 B2
(45) Date of Patent: Jan. 19, 2016

(54) SYSTEM AND METHOD FOR ISSUING PREPAID NEGOTIABLE INSTRUMENTS

(71) Applicant: First Data Corporation, Greenwood Village, CO (US)

(72) Inventor: Felix Weitzman, Conifer, CO (US)

(73) Assignee: FIRST DATA CORPORATION, Greenwood Village, CO (US)

( * ) Notice: Subject to any disclaimer, the term of this patent is extended or adjusted under 35 U.S.C. 154(b) by 0 days.

(21) Appl. No.: 14/464,374

(22) Filed: Aug. 20, 2014

(65) Prior Publication Data

US 2015/0046334 A1    Feb. 12, 2015

Related U.S. Application Data

(63) Continuation of application No. 11/558,874, filed on Nov. 10, 2006, now Pat. No. 8,820,631.

(51) Int. Cl.
| | |
|---|---|
| *G06Q 40/00* | (2012.01) |
| *G06Q 20/04* | (2012.01) |
| *G06Q 20/10* | (2012.01) |
| *G06Q 20/20* | (2012.01) |
| *G06Q 20/28* | (2012.01) |
| *G06Q 20/40* | (2012.01) |
| *G06Q 40/02* | (2012.01) |

(52) U.S. Cl.
CPC .............. *G06Q 20/042* (2013.01); *G06Q 20/04* (2013.01); *G06Q 20/10* (2013.01); *G06Q 20/204* (2013.01); *G06Q 20/28* (2013.01); *G06Q 20/40* (2013.01); *G06Q 40/02* (2013.01)

(58) Field of Classification Search
USPC ......................................................... 235/379
See application file for complete search history.

(56) References Cited

U.S. PATENT DOCUMENTS

2007/0057035 A1* 3/2007 Jackman .............. G06Q 20/042
235/379

* cited by examiner

*Primary Examiner* — Rafferty Kelly
(74) *Attorney, Agent, or Firm* — Kilpatrick Townsend & Stockton LLP

(57) ABSTRACT

Pre-paid negotiable instruments are issued in response to a request at a host system from the holder of a stored-value account. The request is made through an IVR system or a web interface, and the host allocates funds from the account and provides a balance remaining after the negotiable instrument is issued. The instrument is printed with a transaction number or other identifier at an issuing system, and is then sent to the account holder. The account holder activates the instrument after receipt. The payee receives the instrument and authorizes the instrument by providing the transaction number or identifier to the host. When authorized, payment is guaranteed to the payee from the issuer.

27 Claims, 5 Drawing Sheets

530
PRIOR BALANCE    490.57
THIS CHECK       250.00
FEE                1.50
NEW BALANCE      240.07

514

☑ PRINT RECEIPT
DELIVERY
☑ 1ST CLASS MAIL
☐ OVERNIGHT

540 OK

Check (520):
XYZ Bank
ABC St.
New York, NY

CHECK NUMBER  DIGIT
0000001        0
              26-399
DATE: _____ 20___   840

PAY TO THE ORDER OF _____
THE SUM OF Two Hundred Fifty & No/100  DOLLARS $ 250.00

ISSUER NUMBER  TRANSACTION NUMBER
| 1 | 2 | 3 | 4 | 5 | 6 |   | 7 | 5 | 3 | 1 | 7 | 2 | - | 0 | 1 | 7 |

522   532                    534

PAYABLE THROUGH
QRS BANK
MEMBER FDIC
ANYTOWN, ST 98765

To verify please call 1(800)###-####, or verify
through XXXXX Check Authorization Service
No Identification is Required.
John Hancock Chief Financial Officer

⑆ 123456789 ⑆ 99 ⑈ 0009876 ⑈

536

SYSTEM AND METHOD FOR ISSUING PREPAID NEGOTIABLE INSTRUMENTS

CROSS-REFERENCES TO RELATED APPLICATIONS

This application is a Continuation of U.S. application Ser. No. 11/558,874, filed Nov. 10, 2006, and entitled "SYSTEM AND METHOD FOR ISSUING PREPAID NEGOTIABLE INSTRUMENTS," which is incorporated by reference herein.

BACKGROUND OF THE INVENTION

By some estimates, tens of millions of workers in the United States do not have a traditional banking relationship. This fact is driving increasing numbers of employers to assist their "unbanked" employees by establishing financial accounts that use stored-value cards and other similar means. Rather than issuing a traditional paycheck, the employer establishes a stored-value account for the employee, and periodically deposits earned wages into that account. The employee may then use a card (e.g., at an ATM) to access the funds in the account. This provides advantages of wages being paid electronically when the employee does not have or does not want to use a traditional bank account . The employee may quickly access the funds, and the employer will benefit from lower costs from not having to prepare and distribute paper checks.

While stored-value accounts and the associated presentation instruments (e.g., cards) provide employees with convenient access to funds in most cases, there are limitations. For example, while an employee may be able to make ATM cash withdrawals and PIN-based card purchases, the employee may not be able to make "signature-based" purchases, such as by check or other negotiable instrument.

Systems and methods have been developed for permitting stored-value account holders to "write" checks. One exemplary system is described in U.S. patent application Ser. No. 11/223,441, filed Sep. 9, 2005 by Richard Jackman et al, which is hereby incorporated by reference.

In exemplary systems, a consumer receives a batch of "blank" checks for use with a stored value account, and writes a check by contacting the issuer and requesting that funds in the account be allocated to one of the checks. The user is given a transaction number, which the user writes on the check (along with the amount). The issuer allocates the amount (and deducts it) from the available balance in the account. When the check is presented to a merchant or other payee, the merchant contacts the issuer and provides information such as the transaction number and amount. If authentic, the issuer authorizes (verifies the authenticity of) the check, assuring the merchant that the check amount has been set aside and will be paid when the check is processed through the merchant's bank. After authorized, that check (and transaction number) may not be used for any subsequent transaction.

While such a system is effective in giving checking writing capabilities to the "unbanked" consumer, some drawbacks and need for further improvement have been suggested. For example, there may be costs associated with printing a large inventory of blank checks for distribution to users, some of which may never used. Further, should a blank check be misappropriated by an unscrupulous individual, an unsuspecting clerk at a merchant location or store may accept the misappropriated check as payment without conducting the necessary authorization step. Further, some users (particularly less sophisticated consumers that have no experience in maintaining a checking account), may find it burdensome to determine (and remember) the remaining account balance as each check is written, particularly if fees may be charged by the issuer for the check. Users may also make errors in entering the transaction number or other identifying information on the check, making it difficult for the merchant to have the check properly authenticated.

BRIEF SUMMARY OF THE INVENTION

There is provided, in accordance with embodiments of the present invention, a system and method for issuing a negotiable instrument from an account, where funds from an account are allocated to the instrument upon request of the account holder. After the funds are allocated, the instrument is printed by the issuer and sent to the account holder.

In one embodiment, the method comprises receiving, at a host computer system, a request from an account holder for a negotiable instrument for a specific amount of funds in the account. The specific amount is allocated from the account, and a balance remaining in the account is provided to the account holder. A stock of physical, blank negotiable instruments is provided at an issuing location apart from the account holder. In response to allocating the specific amount, identification information which identifies the negotiable instrument is printed at the issuing location on one of the stock of blank negotiable instruments, and the printed negotiable instrument is provided to the account holder.

A more complete understanding of the present invention may be derived by referring to the detailed description of the invention and to the claims, when considered in connection with the Figures.

BRIEF DESCRIPTION OF THE DRAWINGS

FIG. 5 illustrates a user interface displayed to a customer when requesting a negotiable instrument using a web-enabled device.

DETAILED DESCRIPTION OF THE INVENTION

Figure 1:
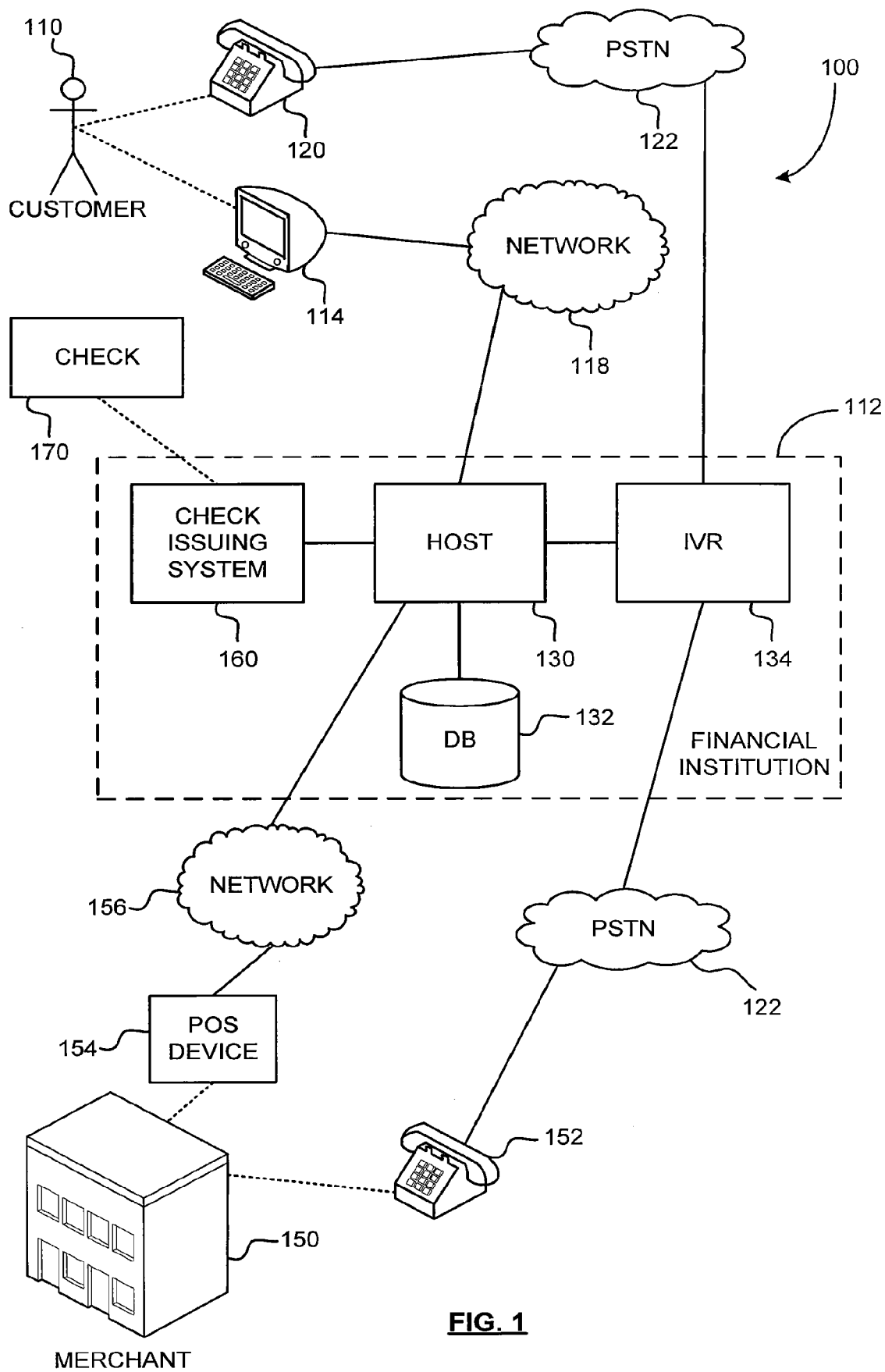
FIG. 1 is a block diagram illustrating a system for issuing negotiable instruments according to one embodiment of the invention.

There are various embodiments and configurations for implementing the present invention. One such implementation is shown in FIG. 1 where, according to an embodiment of the invention, a system 100 is shown for issuing negotiable instruments to a customer or user (account holder) 110. The customer 110 access his/her account at a financial institution 112 from a remote location either through a computer 114 (e.g., personal computer, PDA or other web-enabled device) via a network 118 (e.g., the Internet) or through a telephone 120 via a public switched telephone network (PSTN) 122. The financial institution maintains stored-value accounts at a host computing system 130 and its associated database 132. The financial institution includes an interactive voice response system (IVR) 134 that permits telephone communications between the customer and host 130.

Stored-value accounts maintained at the financial institution are not traditional banking accounts (i.e., FDIC insured savings or checking accounts). Rather, funds are held in the account and may be accessed by the customer using a financial card, e.g., withdrawals at an ATM (not shown), or by presentation of the card and the use of a PIN or similar ID at a merchant or other location.

Since the stored-value account is not a checking account, checks are not drawn against the account, other than as negotiable instruments that have been prepaid or pre-loaded (i.e., the amount of the check has been allocated/reserved against the account prior to presenting the check to a merchant or other payee).

When the customer presents the check to a merchant 150, the merchant obtains authorization (verifies the authenticity) of the check by using a telephone 152 and communicating with host 130 via PSTN 122 and IVR 134. Alternatively, the merchant 150 may use a POS (point of sale) device 154 via a network 156, which may be either a public network (e.g., the Internet) or a private network. In such case, the POS device 154 may be programmed to automatically read the identification information on the check (such as check number, account number, and/or routing code, e.g., through use of a MICR code reader).

The merchant provides the check identification information (transaction number, check number, account number, etc.) and the amount to the host system 130 (either via telephone 152 or via POS device 154) in order to authorize the transaction and verify that funds have been allocated from the stored value account to the check. Once authorized, that check (and any unique identifying information associated with the check, such as transaction number) may not be used in any future transaction. This prevents the customer or a third party from making payment in subsequent transactions using the same check information. In some cases, the financial institution may provide, as part of an authorization, a warranty or guarantee that the check will be paid. Also, the merchant may not require (or need) identification from the user (since payment is warranted).

Such checks/negotiable instruments and their use as thus far described are explained in greater detail in aforementioned application Ser. No. 11/223,441.

In some embodiments of the invention, and as illustrated in FIG. 1, the financial institution 112 includes a check issuing system 160. The check issuing system 160 eliminates the need for the customer 110 to maintain a supply of blank checks. As will be described in greater detail in connection with FIGS. 2-5, the issuing system 160 prints a check 170 using funds from the stored value account. Such check is printed in response to the customer communicating with the host 130 (accessing the host 130 via telephone 120 or computer 114). After printing the check with the requested amount and appropriate transaction identifying information (transaction number, check number, account number and/or routing information), the check is sent to the customer for use when making payment to the merchant 150. The customer may write in the payee name and date when presenting the check to the payee.

While FIG. 1 illustrates the financial institution 112 as the issuer of the check, in some embodiments the check could be printed and issued by a separate entity (e.g., licensed money transmitter) agreeing to provide checks against accounts maintained by the financial institution.

Figure 2:
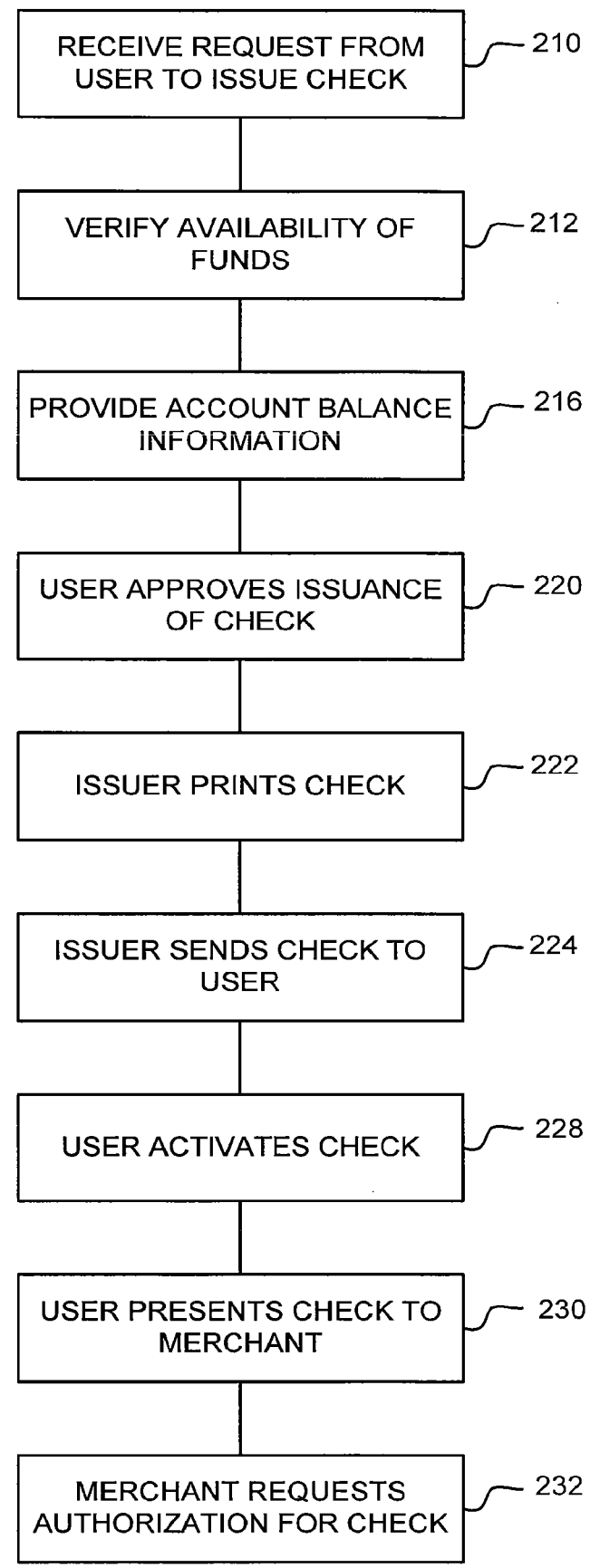
FIG. 2 is a flow diagram illustrating the overall operation of the system of FIG. 1.

Referring now to FIG. 2, the overall operation of the system 100 (FIG. 1) is illustrated. A customer or user first requests (step 210) a check be issued by the financial institution by communicating with host 130. As one example, the customer may enter an account number and requested amount (via phone or computer). The system may also require that the user enter a PIN or other unique personal ID to assure the person making the request is authorized to do so. Such information can be checked by the host computer against account data within database 132. In response to the request, the host computer 130 verifies (step 212) the customer and an account, and provides the balance in the account that is available (step 216) after the proposed transaction amount. As will be described in greater detail later, in some embodiments the system will provide to the customer the prior balance (before the transaction), the amount of any fees, and the remaining balance (after the transaction), so that if the customer wants to request an additional check, the amount available for such check will be known.

The customer is then requested to approve the issuance of the check (step 220), at which time the host 130 allocates the amount of the check from the funds in the account (they are then no longer available for subsequent transactions) and instructs the check issuing system to print a check with information relevant to the transaction. In one embodiment, the printed check includes (in human readable form) the amount of the check and a transaction number associated with the requested transaction, printed on the face of the check. In other embodiments, the check may further include encoded information, in the event the payee or merchant has equipment for electronically reading the check (check number, account number, routing number). The encoded information may be printed using magnetic ink code recognition (MICR) technology, bar code technology and so forth. In some embodiments, the transaction number and check amount can also be encoded so as to be electronically read.

The issuer then sends the check to the customer (step 224). As should be appreciated, the check may be transmitted in various ways. It could be sent via mail, courier (e.g. overnight delivery) or other suitable means.

Once the customer receives the check, it is activated by the user (step 228). As an example, the user may telephone the issuer and provide check identifying information (check number, transaction number, etc.) and then a unique personal identifier (social security number, PIN, etc.). Until the check is activated by the customer, it cannot be used for payment, i.e., the system 100 will not recognize a request by a merchant or other party to authorize the check for payment. This steps prevents loss from theft or misappropriation of the check while in transit, since the person having the check under such circumstances will not have the unique personal identifier, and until such time as the customer activates the check it cannot be used to conduct a transaction.

After the check has been activated, the customer may at any time present the check to a merchant or other payee for payment (step 230). The merchant then authorizes the check (step 232) by communicating with the host 130 (via telephone 152 or POS device 154), providing check identifying information (e.g., transaction number and amount). As part of the authorization process, the merchant receives verification from the host computer that the check is valid (for the specified amount) and the host completes a record of the transaction so that the same check (including transaction number) cannot be used for a subsequent transaction.

Figure 3:
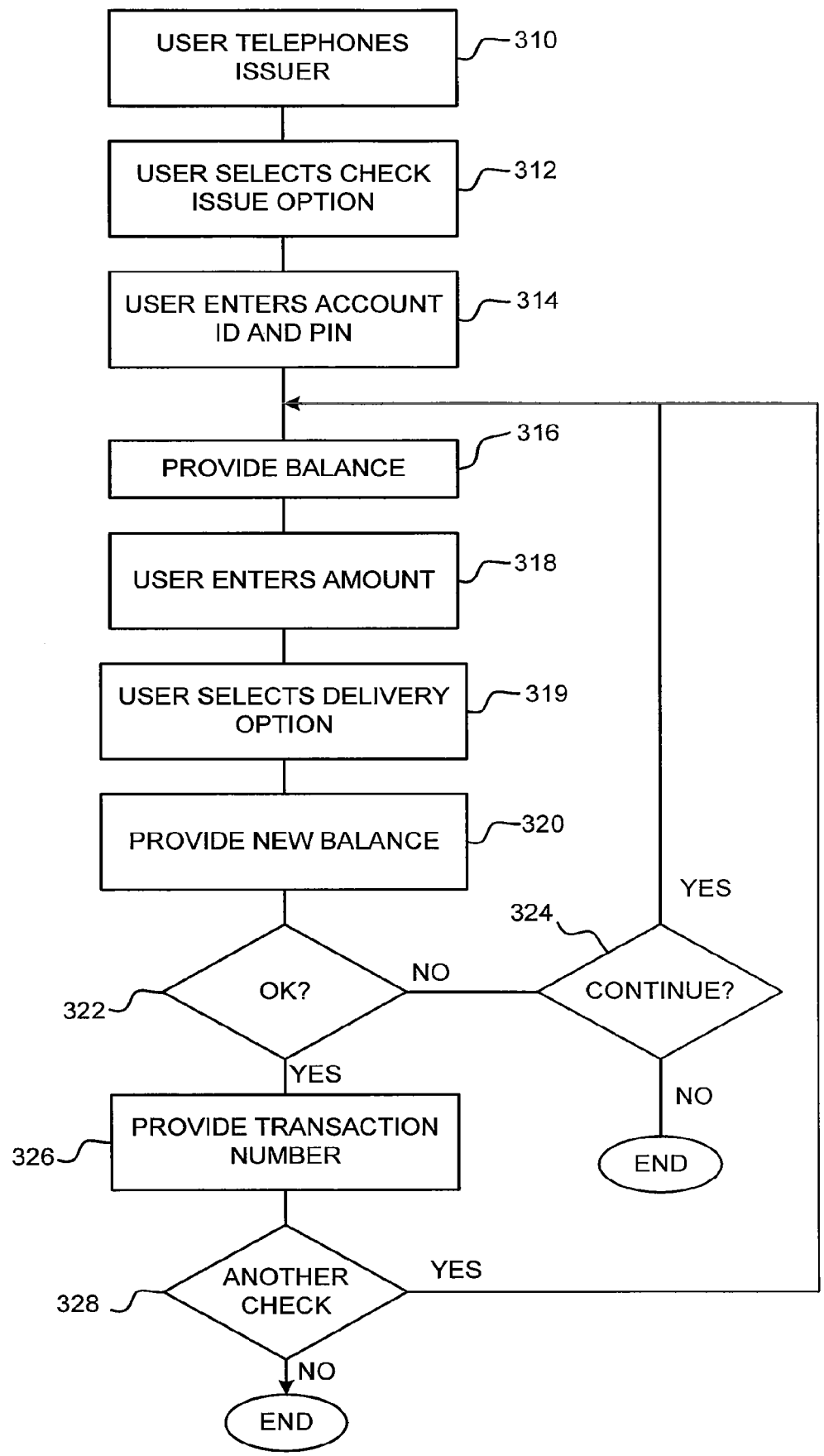
FIG. 3 is a more detailed flow diagram, illustrating the use of an interactive voice response system (IVR) in the operation of the system of FIG. 1.

As mentioned earlier, in some embodiments the customer uses the telephone 120 and IVR 134 to interact with host 130 in requesting a check (steps 210-220, FIG. 2), and such a process is illustrated in greater detail in FIG. 3. At step 310, the customer telephones host 130 and enters data (such as by using the telephone keypad) in response to prompts from the IVR. The customer selects a check issue request option at step 312, and then enters the account number and user PIN (step 314). The host 130 provides the current balance available to the user (step 316) and the user enters the amount for the check that is being requested (step 318) and selects a delivery option (step 319). In response, the host provides the new balance that would be remaining after issuing the check (step 320). It should be appreciated the new balance would not only reflect the amount of the check to be deducted from the old balance, but also any check processing fee and delivery charges. As one example, a customer may be given one check per payroll period that can be written free of fees, and thereafter pay $1.50 per check. As another example, a customer selecting normal postal delivery (1st class mail) may not pay any delivery charge. However, if overnight delivery is requested, the amount of such delivery charge would be figured into the transaction and deducted from the account balance.

If the transaction is acceptable to the customer at step 322, the system provides a transaction number to the user at step 326, which the user may make note of as a record of the transaction. The transaction number will also be printed on the check. If the transaction and new balance are not approved by the customer at step 322, the customer may elect to continue (step 324) and repeat the process for a transaction (e.g., with a different check amount), or elect to not continue and the process then ends.

If the user has approved the transaction and receives a transaction number, he or she may elect to request another check (step 328), in which case the process repeats (beginning at step 316, by providing a new balance). This allows for multiple checks to be mailed in one parcel or envelope if more than one check is purchased in the same session (IVR or Internet). If another check is not being requested at step 328, the process ends.

Figure 4:
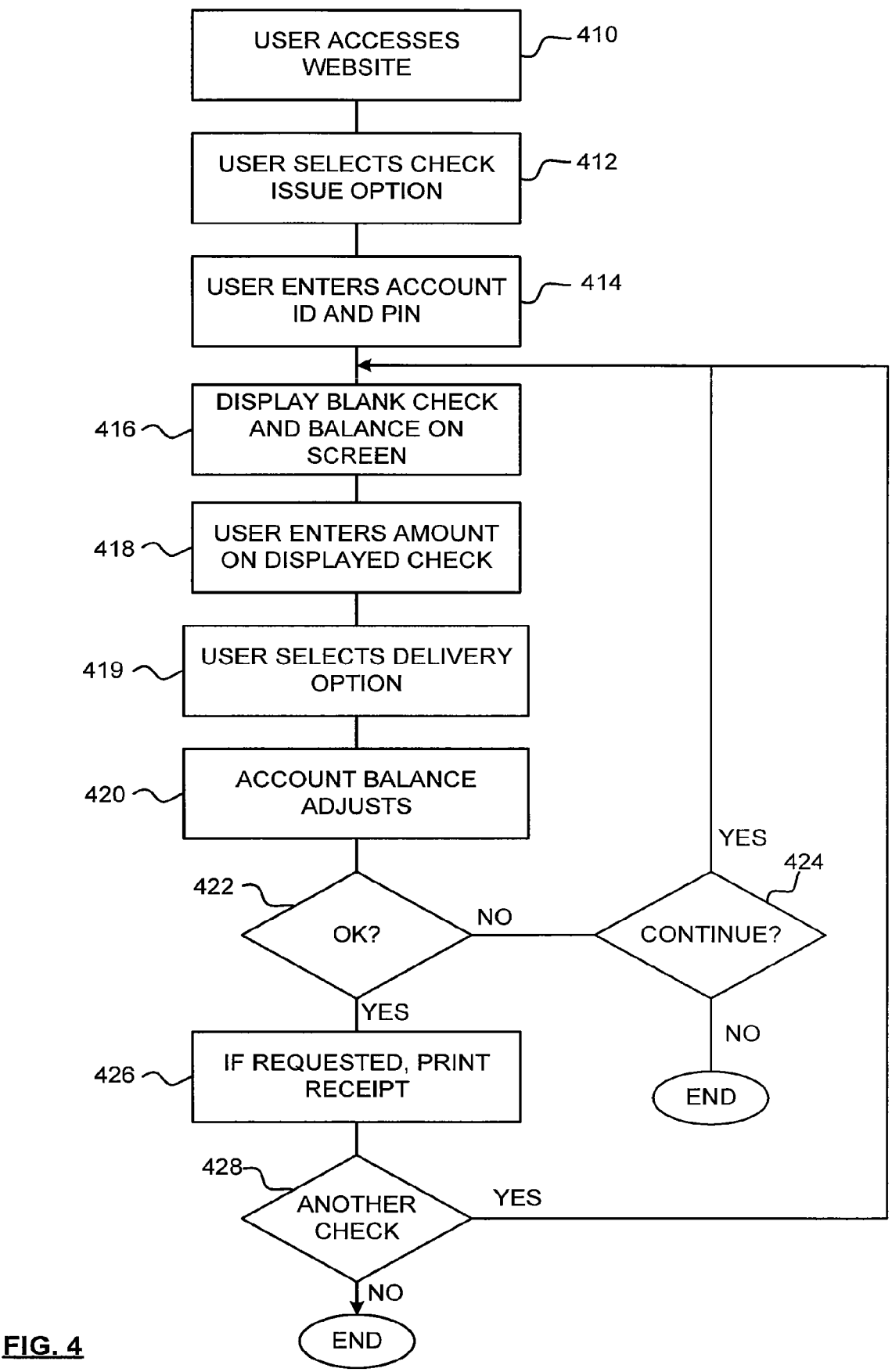
FIG. 4 is a more detailed flow diagram, illustrating the use of a web-enabled device in the operation of the system of FIG. 1.

In some embodiments, the customer may use the computer 114 or similar user device (e.g., a web-enabled device) and a resulting web interface to request a check, and one such process is illustrated in FIG. 4. The user first accesses a website hosted by the financial institution (step 410). The website may be resident at a server in communication with host 130 or may be resident at host 130 itself. The website provides an option selected by the user for having a check issued (step 412). The user enters the account number and PIN (step 414) and a screen is displayed for providing the available balance (step 416) and for entering in the amount of the check (step 418).

A exemplary screen 510 used in the process of FIG. 4 is seen in FIG. 5. Such screen 510 includes a panel 512 with an actual representation of the check to be issued and a panel 514 with account balance information (note that the check printed and issued in either the embodiment of FIG. 3 or the embodiment of FIG. 4 will have the appearance seen at panel 512 in FIG. 5). Panel 514 will display the overpayment delivery charge if the "OVERNIGHT" box is checked. In other embodiments, there may be other delivery charges (e.g., the customer may be charged the cost of 1st class mail), and such charges would be reflected at panel 514.

The user directly enters the amount of the check at the amount box 520, and such amount is automatically written at the sum line 522 and appears at the check amount field 530 at panel 514.

The check may also display an issuer number 532, a transaction number 534, and encoded information 536. In some embodiments some of the illustrated information may not appear on the screen 510, but might be printed in the check when issued at system 160. Also, the bank's name and the "Payable Through" bank could be printed based on the issuer account affiliation, further increasing the versatility of the paper stock.

Returning to FIG. 4, the user selects a delivery option (step 419) and the account balance is adjusted (step 420) to reflect the amount of the check and the cost (if any) of the delivery option (see FIG. 5) and any fee charged by the issuer. The user approves the check (step 422) using button 540 (FIG. 5) and receives a printed receipt (step 426) if the receipt was requested at screen 510. Any or all of the displayed information on screen 510 (including a representation of the check) may be included in the receipt (if one is requested). If the user does not approve the check at step 422, the process can continue at step 424 with the user repeating the steps beginning with the display of a blank check and balance at step 416. Otherwise, if the user decides not to continue at step 424, the process ends.

If the check is approved at step 422, the user may decide to request another check (step 428), in which case the process repeats beginning at step 416. Otherwise, the process ends.

While a detailed description of presently preferred embodiments of the invention has been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A method for issuing a negotiable instrument from funds in an account that is maintained at a host computer system, the method comprising:
   receiving, at the host computer system, a request from an account holder for a negotiable instrument in the form of a paper check to be provided to the account holder, including a request to allocate a specific amount of funds from the account;
   allocating the specific amount from the account;
   providing a paper stock of physical, blank negotiable instruments at an issuing location remote and apart from the account holder;
   in response to and after allocating the specific amount, printing at the issuing location and on one of the stock of blank negotiable instruments, identification information which identifies the negotiable instrument;
   providing the printed negotiable instrument to the account holder as the requested negotiable instrument, by sending the negotiable instrument to the account holder at the location of the account holder that is remote and apart from the issuing location; and
   after the printed negotiable instrument is received by the account holder, and before the negotiable instrument is presented to a payee, activating the printed negotiable instrument at the host computer system by the account holder providing a personal identifier to the host computer system.

2. The method of claim 1, further comprising:
   providing to the account holder a balance remaining in the account after allocating the specific amount.

3. The method of claim 1, wherein the account is a stored-value account, and wherein the identification information printed on the check comprises a transaction identifier identifying the transaction for which the negotiable instrument is being used to make payment to the payee, so that the negotiable instrument may not be used for other transactions.

4. The method of claim 3, further comprising:
verifying the availability of the specific amount in the stored-value account in response to a request from the account holder for a negotiable instrument.

5. The method of claim 3, wherein the stored-value account is funded by payroll funds owed by an employer to an employee.

6. The method of claim 1, wherein the request to allocate a specific amount of funds to the negotiable instrument is communicated by the account holder through a telephone voice response unit employing interactive voice response technology, with the account holder being at a location remote from the host computer system.

7. The method of claim 1, wherein the request to allocate a specific amount of funds to the negotiable instrument is communicated through a web interface by the account holder, wherein the web interface provides a graphical representation of the negotiable instrument and the account balance, and wherein the account holder is at a location remote from the host computer system.

8. The method of claim 1, wherein the printing step further comprises:
printing the specific amount on the negotiable instrument.

9. The method of claim 1, wherein the identification information comprises a transaction identifier.

10. The method of claim 1, wherein the identification information is chosen from a group comprising a routing number, a check number, and an account number.

11. The method of claim 1:
wherein the identification information is printed on the negotiable instrument with magnetic ink character recognition ("MICR") technology; and
wherein the method further comprises:
presenting the printed negotiable instrument as payment at a payee location having a POS device, the POS device including a MICR reader which automatically reads the identification information from the negotiable instrument.

12. The method of claim 1, further comprising:
presenting the negotiable instrument to a payee; and
authorizing the negotiable instrument in response to receiving the specific amount and the identification information from the payee.

13. The method of claim 12, wherein the authorizing step comprises querying a database, wherein the database indicates, in response to receiving the specific amount and the identification information, that the negotiable instrument has been allocated the specific amount of funds specified in the request.

14. The method of claim 12, wherein:
no form of personal identification is required from a user of the negotiable instrument when presenting the instrument as payment; and
the authorizing step further comprises a warranty to the payee for the negotiable instrument.

15. A system for issuing a negotiable instrument in the form of a paper check to an account holder, comprising:
a host computer system for maintaining an account for the account holder from which funds are used to pay the negotiable instrument; and
an issuing system in communication with the host computer system for printing negotiable instruments from blank paper stock;
wherein the host system allocates a specific amount from the account in response to a request from the account holder for a negotiable instrument to be provided to the account holder for the specific amount, provides to the account holder a balance remaining in the account after allocating the specific amount, instructs the issuing system to print the requested negotiable instrument from the blank paper stock in response to allocating the specific amount, the printed negotiable instrument including identification information which identifies the negotiable instrument, and activates the negotiable instrument in response to receiving a personal identifier from the account holder;
wherein the issuing system prints and provides the printed negotiable instrument to the account holder as the requested negotiable instrument, and wherein the issuing system is at a location remote from the account holder.

16. The system of claim 15, wherein the host system provides to the account holder a balance remaining in the account after allocating the specific amount.

17. The system of claim 15, wherein the account is a stored-value account.

18. The system of claim 15, wherein the host computer system activates the negotiable instrument in response to a request from the account holder and after receipt of the printed negotiable instrument from the host computer system.

19. The system of claim 15, wherein the request from the account holder to activate includes the personal identifier, and wherein the host computer system compares the personal identifier to information stored at the host computing system.

20. The system of claim 15, wherein the host computing system verifies the availability of the specific amount in the account in response to a request from the account holder for a negotiable instrument.

21. The method of claim 15, wherein the account is funded by payroll funds owed by an employer to an employee.

22. The system of claim 15, further comprising:
a telephone voice response unit employing interactive voice response technology and in communication with the host computer system;
wherein the request to issue the negotiable instrument is communicated from the account holder through the telephone voice response unit.

23. The system of claim 15, further comprising;
a web interface in communication with the host computer system;
wherein the request to issue the negotiable instrument is communicated from the account holder through the web interface.

24. The system of claim 15, wherein the identification information is printed on the negotiable instrument with magnetic ink character recognition ("MICR") technology; and
wherein the system further comprises a POS device including a MICR reader at a payee location which automatically reads the identification information from the negotiable instrument.

25. The system of claim 15, wherein the host computer system authorizes the negotiable instrument in response to receiving the specific amount and the identification information from a payee.

26. The system of claim 15, wherein the host computing system authorizes the negotiable instrument by querying a database associated with the host computer system, and wherein the database indicates, in response to receiving the specific amount and the identification information, that the negotiable instrument has been allocated the specific amount of funds specified in the request.

27. A method for issuing a pre-paid negotiable instrument in the form of a paper check from funds in a stored-value account that is maintained at a host computer system and that is not an FDIC insured account, the method comprising:

receiving, at the host computer system, a request from an account holder for a negotiable instrument in the form of a paper check to be provided to the account holder, including a request to allocate a specific amount of funds from the account;

in response to the request from the account holder, allocating at the host computer the specific amount from the account;

providing a paper stock of physical, blank negotiable instruments at an issuing location remote and apart from the account holder;

in response to and after allocating the specific amount, printing at the issuing location and on one of the stock of blank negotiable instruments, both the specific amount and identification information which identifies the negotiable instrument and which includes a transaction number that identifies the transaction for which the negotiable instrument is being used for payment, so that the negotiable instrument may not be used for other transactions;

providing the printed negotiable instrument to the account holder as the requested negotiable instrument, by sending the negotiable instrument to the account holder at the location of the account holder that is remote and apart from the issuing location;

activating the negotiable instrument at the host computer after the account holder receives the printed negotiable instrument, in response to the account holder providing a personal identifier to the host computer system;

presenting the activated negotiable instrument by the account holder to a payee; and authorizing at the host computer the negotiable instrument in response to receiving the specific amount and the identification information from the payee, including providing a warrant guaranteeing payment to the payee of the specified amount and recording at the host computer system that the transaction using the negotiable instrument has been authorized, so that any future request to authorize any other transaction using the same negotiable instrument will be declined.

\* \* \* \* \*